United States Patent [19]
Lubowitz et al.

[11] Patent Number: 4,739,030
[45] Date of Patent: Apr. 19, 1988

[54] DIFUNCTIONAL END-CAP MONOMERS

[75] Inventors: Hyman R. Lubowitz, Rolling Hills Estates, Calif.; Clyde H. Sheppard, Bellevue, Wash.

[73] Assignee: The Boeing Company, Seattle, Wash.

[21] Appl. No.: 816,489

[22] Filed: Jan. 6, 1986

Related U.S. Application Data

[60] Continuation-in-part of Ser. No. 704,475, Feb. 22, 1985, abandoned, which is a division of Ser. No. 505,348, Jun. 17, 1983, Pat. No. 4,536,559.

[51] Int. Cl.$^4$ ............................................. C08G 69/26
[52] U.S. Cl. ..................... 528/170; 528/173; 528/345; 548/435; 548/476; 548/547
[58] Field of Search .................. 548/435, 476, 547; 528/170, 173, 345

[56] References Cited

U.S. PATENT DOCUMENTS 4,225,497  9/1980  Baudovin et al. .................. 548/435
4,661,604  4/1987  Lubowitz et al. .................. 548/435

*Primary Examiner*—John Kight
*Assistant Examiner*—M. L. Moore
*Attorney, Agent, or Firm*—John C. Hammar

[57] ABSTRACT

The solvent resistance of polysulfone, polyether sulfone, and polyesters is enhanced by using difunctional end-cap monomers of the present invention to provide improved crosslinking. The imidophenol monomers include two unsaturated functionalities capable of crosslinking upon thermal or chemical activation. Oligomer, oligomer blends, pregregs, and composites using the novel end caps are also described.

8 Claims, No Drawings

DIFUNCTIONAL END-CAP MONOMERS

REFERENCE TO RELATED APPLICATIONS

This application is a continuation-in-part application based upon U.S. application Ser. No. 704,475, filed Feb. 22, 1985, now abandoned, which was a divisional application based upon U.S. application Ser. No. 505,348, filed June 17, 1983, now U.S. Pat. No. 4,536,559.

TECHNICAL FIELD

The present invention relates to novel, difunctional, crosslinking end-cap monomers useful in the synthesis of high performance oligomers that contain polysulfone or polyethersulfone backbones. Blended oligomers including crosslinking polysulfones and polyethersulfones mixed with comparable noncrosslinking oligomers are also described.

BACKGROUND ART

Although thermoplastic resins and their applications are well known, reinforced resins are relatively new and have significant advantages over pure, resinous composites. Fiber reinforcement toughens and stiffens the resin to produce high performance products. At the same time, processing is not seriously hindered because the reinforced resin maintains its thermoplastic character. For example, a sheet of fiber reinforced resin can be heated, stamped into a desired shape by appropriate dies, reheated and restamped to alter the shape. In contrast, a thermosetting resin cannot be reshaped, once it is fully cured by heating. Thermoplastic resins however, generally exhibit poor solvent resistance, and this deficiency has severely limited their use. For example, reinforced thermoplastic resin circuit boards of conventional design cannot be cleaned by solvents commonly used in the manufacture of circuit boards. Hydraulic fluids and cleaning fluids in aircraft limit adoption of conventional thermoplastic resins unless their solvent resistance can be improved.

SUMMARY OF THE INVENTION

Our U.S. Pat. No. 4,536,559 discloses and claims a series of thermoplastic resins that resist attack by organic solvents because they include novel, difunctional end-cap monomers to provide crosslinking. These resins have aromatic backbones, for thermal stability and are resistant to solvents conventionally used in aerospace applications, such as MEK and methylene chloride. Preferably the oligomers are polysulfones and polyethersulfones that can be crosslinked by thermal and/or chemical activation through the difunctional end-cap monomers. The present invention relates to novel end-cap monomers which enhance the physical properties of the resins, particularly by increasing the solvent resistance of composites and laminates made from prepregs of the oligomers.

The oligomers are prepared by reacting:
(1) 2 moles A—OH,
(2) (n+1) moles X—R—X (a dihalogen), and
(3) n moles OH—R'—OH (a bisphenol),
wherein A is

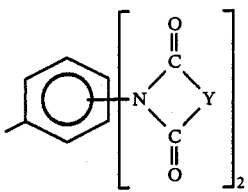

Y is selected from the group containing of:

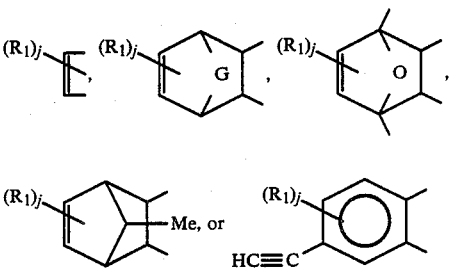

$R_1$ is lower alkyl, aryl, substituted aryl, lower alkoxy, or mixtures thereof (preferably lower alkyl of less than 4 carbon atoms); G is —$SO_2$—; —S—, —$CH_2$—, or —O— (preferably —$CH_2$—); j=0, 1, or 2; x is halogen (preferably chlorine); R is an aromatic radical; R' is an aromatic radical; and n is selected so that the polymer has a molecular weight between about 1,000 and 40,000. The preferred molecular weight for oligomers is between about 5,000 and about 30,000, and more preferably between about 10,000 and 20,000. Preferably, R is selected from the group consisting of:

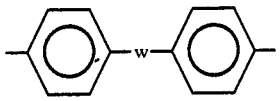

wherein w=—$SO_2$—, —S—, or —$(CF_3)_2C$—. R' is preferably selected from the group consisting of: phenyl, biphenyl, or

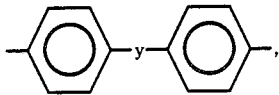

wherein y=—$(CH_3)_2C$—;  —S—,  —O—,  —$SO_2$—, and —$(CF_3)_2C$—.

Substituent groups selected from the group consisting of halogen, alkyl groups having 1 to 4 carbon atoms, alkoxy groups having 1 to 4 carbon atoms, aryl, or substituted aryl may depend from the aryl groups of the oligomer backbone. While para isomerization is shown, other isomers may be used. Substitutent groups present steric hindrance problems, and, therefore, unsubstituted aryl groups are preferred.

The oligomers are made by (a) mixing compounds (1), (2), and (3) with $K_2CO_3$ or another suitable buffer or "scavenger" in a solvent in the presence of an inert atmosphere, and (b) heating the mixture, if necessary, to react the compounds.

Compounds of the formula:

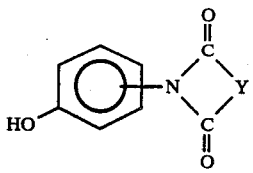

wherein Y is selected from the group:

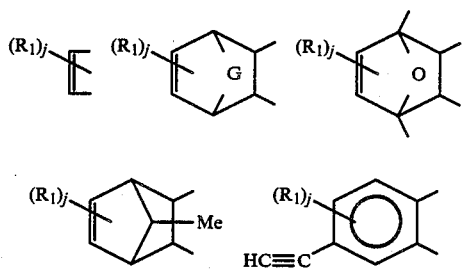

$R_1$ = lower alkyl, lower alkoxy, aryl, substituted aryl, or mixtures thereof (preferably lower alkyl);
G = —$SO_2$—, —S—, —O—, or —$CH_2$—;
j = 0, 1, or 2
are novel compounds which constitute the preferred difunctional end-cap monomers (imidophenols) of the present invention.

These novel monomers are prepared by reacting, a suitable anhydride with diaminophenol in a solvent in the presence of an inert atmosphere.

Prepregs can be prepared from the oligomers, and composites from cured prepregs or cured oligomers. Blended oligomers comprising substantially equimolar amounts of the crosslinking oligomers bearing the difunctional end-cap monomers and comparable oligomers having substantially identical backbones but non-crosslinking end caps are also described. These blended oligomers provide improved physical properties having greater strength and toughness while retaining adequate solvent resistance.

Curing times are reduced, solvent resistance is improved (with a decrease in thermoplasticity), and lower temperatures can be used during the curing step by forming prepregs containing (1) the oligomers or blended oligomers and (2) a suitable coreactant containing comparable crosslinking functionalities to those on the crosslinking oligomer.

BEST MODE CONTEMPLATED FOR CARRYING OUT THE INVENTION

The difunctional end-cap monomers (imidophenols) of the present invention are derived from compounds that are condensation products of aminophenols and anhydrides. Polymers using these monomers are prepared in solvent polymerization by reacting bisphenols, dihalogens, and the imidophenol monomers. Average formula weights of the oligomers are controlled by controlling the concentrations combinations of the three components.

Thus, crosslinkable oligomers are formed by reacting:
(1) 2 moles A—OH,
(2) n+1 moles X—R—X, and
(3) n moles OH—R'—OH, wherein A is

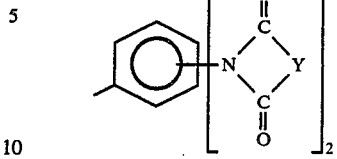

wherein Y is selected from the group consisting of:

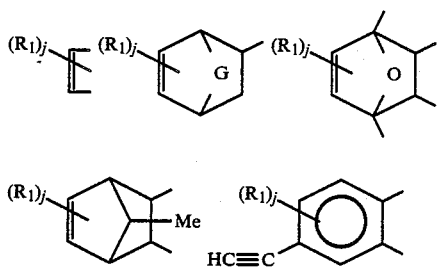

wherein $R_1$ lower alkyl, aryl, substituted aryl, lower alkoxy, or mixtures thereof (preferably lower alkyl of less than 4 carbon atoms); G is —$SO_2$—, —S—, —$CH_2$—, or —O— (preferably —$CH_2$—); j = 0, 1, or 2; X is halogen (preferably chlorine); R is an aromatic radical; R' is an aromatic radical; and n is selected so that the polymer has a molecular weight between about 1,000 and 40,000. The resulting product has the polyether structure:

$$A—O—R—O—R'—O_n—R—O—A$$

This reaction is carried out by mixing the three compounds with NaOH, KOH, $K_2CO_3$, $Na_2CO_3$, $NaHCO_3$, $KHCO_3$, or mixtures thereof in a solvent in the presence of an inert atmosphere and heating the mixture, as necessary, to react the compounds. The reaction mixture accordingly is basic to avoid undesired side reactions. $K_2CO_3$ is the preferred "scavenger".

The average formula weight of the resulting oligomers ranges between 1,000 and 40,000; preferably between about 5,000 and 30,000; and, more preferably, between about 10,000 and 20,000. Within these ranges, the oligomers can be crosslinked in a curing step, such as vacuum bagging, to form thermoplastic polymers that are solvent resistant. Since uncured oligomers are relatively soluble in conventional prepregging solvents, they can be easily processed into prepregs.

An oligomer having an average formula weight below about 1,000 undergoes excessive crosslinking and loses its thermoplastic properties (the oligomer is thermosetting). An oligomer having an average formula weight above about 40,000, on the other hand, has insufficient crosslinking and has inadequate solvent resistance.

The difunctional end-cap monomers of the present invention usually are pure compounds, but mixtures of monomers having similar cure activation temperatures may also be used to form oligomers having two or more end-cap types.

Typical bisphenols used to prepare the preferred oligomers include hydroquinone, bisphenol A, p,p'-bisphenol, 4,4'-dihydroxydiphenylsulfide, 4,4'-dihydroxydiphenylether, 4,4'-dihydroxydiphenylhexafluoropropane, a compound described in U.S. Pat. No. 3,262,914, or mixtures thereof. Particularly preferred bisphenols include:

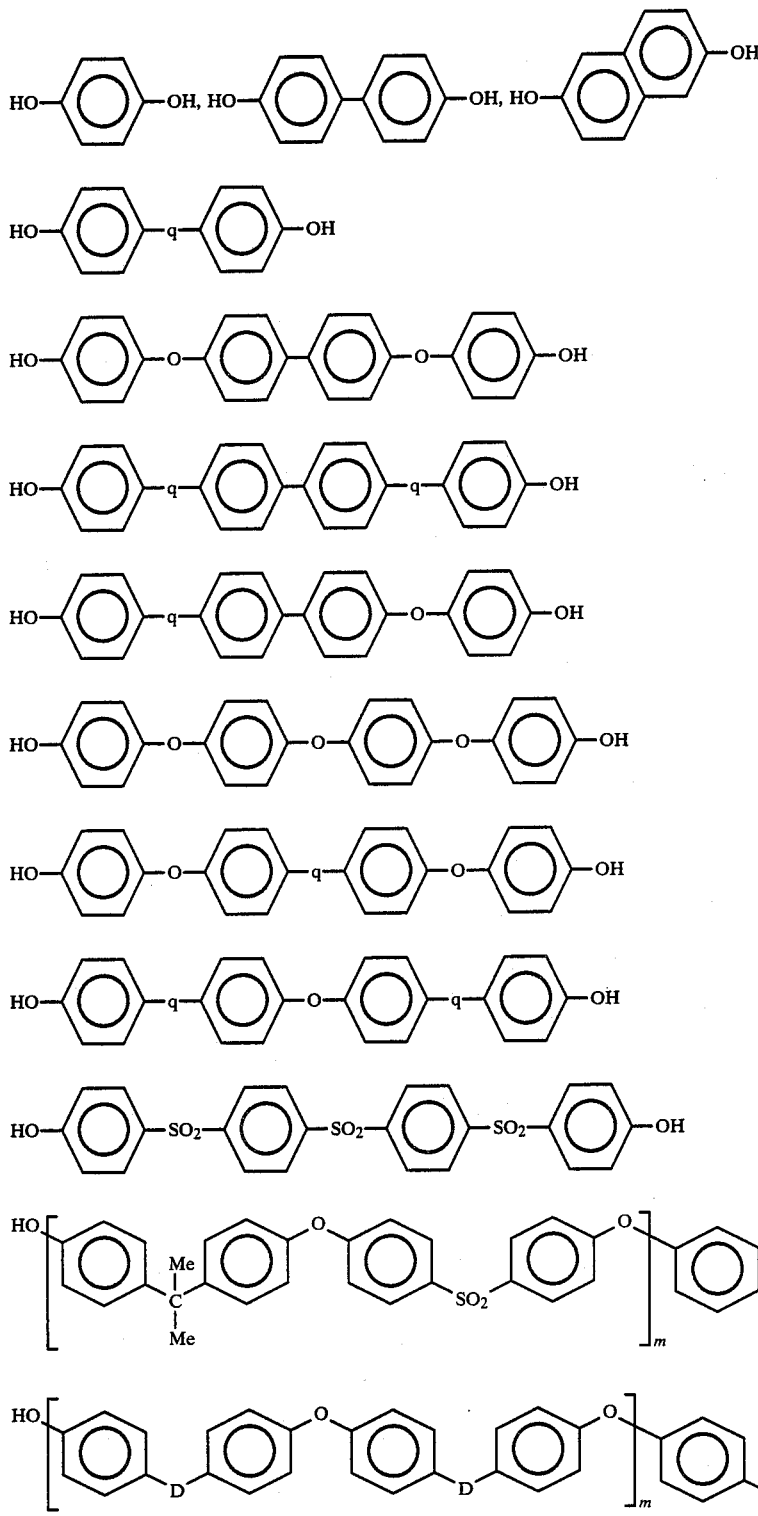

wherein
q=—SO₂—, —CO—, —S—, or —(CF₃)C—, and preferably —SO₂— or —CO—;
Me=CH₃—;
m=an integer, generally less than 5, and preferably 0 or 1; and
D=any of —CO—, —SO₂—, or —(CF₃)₂C—.

While bisphenol A is preferred, the other compounds can be used to add rigidity to the oligomer without significantly increasing the average formula weight, and, therefore, can increase the solvent resistance. Random or a block copolymers are possible.

Preferred dihalogens include 4,4'-dichlorodiphenylsulfone, 4,4'-dichlorodiphenylthioether, 4,4'-dichlorodiphenylhexafluoropropane, or mixtures thereof, although the dihalogen can be selected from the group consisting of:

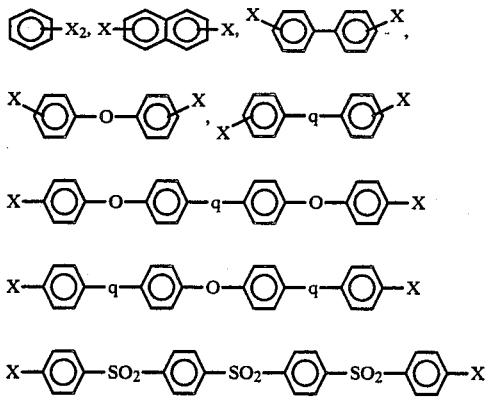

wherein
X = halogen, preferably chlorine; and
q = —S—, —SO$_2$—, —CO—, —(CH$_3$)$_2$C—, and (CF$_3$)$_2$C—, and preferably either —SO$_2$—, —CO—.

Crosslinking occurs upon heating the oligomers to about 450° F. to 700° F., with the preferred range being 500° F. to 650° F. Lower curing temperatures may be used if coreactants are added to the oligomers. The coreactants also accelerate the curing reaction, increase solvent resistance, and decrease the thermoplasticity of the resin.

For oligomers having maleic end-caps, A suitable coreactant is selected from the group consisting of p-phenylenediamine, benzidine, 4,4'-methylenedianiline, simple diamines of the formula: H$_2$N—R—NH$_2$ wherein R is an alkyl having 2 to 6 carbon atoms, or mixtures thereof. For oligomers containing the norbornene group, a suitable coreactant is:

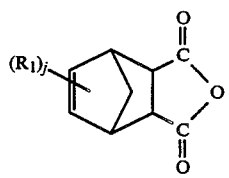

and

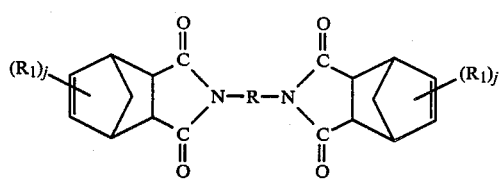

wherein R is an alkyl having 2 to 6 carbon atoms or an aromatic radical such as:

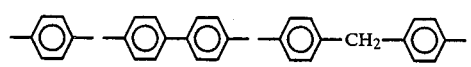

and R$_1$ and j are as previously defined.

Suitable coreactants for oligomers containing the acetylene group include:

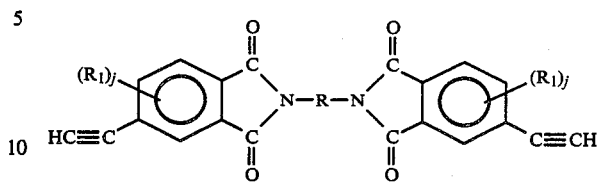

wherein R, R$_1$ and j are as previously defined.

The following examples are presented to illustrate various features of the invention:

EXAMPLE 1

Synthesis of 1-hydroxyphenyl-2,4-dinadimide

Under dry N$_2$, a slurry of 19.71 g (0.1 moles) of purified 2,4-diaminophenol dihydrochloride was prepared containing 10 percent solids in 17.39 g of N,N-dimethylacetamide. 16.80 g (0.2 moles) dry NaHCO$_3$ was added. After foaming subsided, 65.61 g xylene and 32.83 g (0.2 moles) 5-norbornene 2,3-dicarboxylic anhydride were slowly added. Transferred to a Barrett trap filled with xylene, the reaction mixture was refluxed (150° C.) until no more water was collected in the Barrett trap. The product was precipated in water, separated by filtration, and washed.

EXAMPLE 2

Synthesis of 1-hydroxyphenyl-3,5-dinadimide

The process of Example 1 was repeated except that 0.1 moles of 3,5-diaminophenol dihydrochloride was substituted for 2,4-diaminophenol dihydrochloride.

EXAMPLE 3

Synthesis of 1-hydroxyphenyl-2,4-dinadic (cap 10% excess, 20% excess K$_2$CO$_3$, Formula weight 20,000)

In a 1000-ml resin kettle fitted with a mechanical stirrer, thermometer, condenser, Dean Stark trap, and dry N$_2$ purge, add 405.8 grams of dimethylacetamide was added to 173.9 grams toluene, 5.70 grams (0.014 mole) of 1-hydroxyphenyl-2,4-dinadimide (the compound of Example 1), 98.35 grams (0.273 mole) of 4-chlorophenylsulfone, 60.87 grams (0.267 mole) bisphenol A, and 45.25 grams potassium carbonate. Heated to 140° C., the mixture was refluxed for 72 hours, before raising the temperature to 160°–165° C. to distill off the toluene. Refluxing at 160°–165° C. continued for 1 hour after all toluene was collected. The product was recovered thereafter by conventional steps.

EXAMPLE 4

Synthesis of 1-hydroxyphenyl-3,5-dinadimide (cap 10% excess, 20% excess K$_2$CO$_3$, Formula weight 20,000)

Using the procedure of Example 3, but substituting 1-hydroxyphenyl-3,5-dinadimide (the compound of Example 2) for 1-hydroxyphenyl-2,4-dinadimide yielded the desired product.

EXAMPLE 5

Preparation of composites

The oligomer obtained from either Example 3 or 4 was impregnated on epoxy-sized T300/graphite fabric style (Union Carbide 35 million modulus fiber 24×24 weave) by sweeping a 10 to 15% resin solids solution of the oligomer in methylene chloride into the fabric, taking care to wet the fibers as well as possible. The oligomer comprised about 38 wt.% of the resulting prepreg. After drying to less than 1 percent volatile content, the prepreg was cut into 6×6-inch pieces and stacked to form a laminated composite of approximately 0.080 inch upon curing in a conventional vacuum bag process under 100 psi in an autoclave at 625° F. for at least 6 hours. The composite exhibited substantial resistance to conventional solvents, such as MEK and methylene chloride.

While the end-cap monomers (imidophenols) of the present invention have been illustrated for the preparation of polysulfone or polyethersulfone oligomers having improved solvent resistance, the monomers can also be used, of course, in other condensation reactions, particularly the condensation of carboxylic acids or acid halides with phenols (—OH) as illustrated on our copending U.S. patent application No. 726,259, filed Apr. 23, 1985.

Although the oligomers that have been illustrated have essentially only aryl backbones separated by "sulfone" or ether linkages, the end-cap monomers can also be used in aliphatic or mixed arylaliphatic polyethers or polyesters.

Blended oligomers can also be prepared using the difunctional end-cap monomers on a crosslinking oligomer of the blend and a noncrosslinking, "quenching" monomer on a comparable oligomer in the blend. That is, a substantially equimolar block copolymer or blended polymer can be synthesized wherein a crosslinking oligomer, as defined above, is blended with a comparable oligomer formed by the condensation of (n+1) moles of the dihalogen used in the crosslinking oligomer, n moles of the bisphenol used in the crosslinking oligomer, and 2 moles of a reactive phenol. The comparable oligomer, accordingly, will not have the crosslinking ability of the crosslinkable oligomer, will have a backbone virtually identical with that of the crosslinking oligomer, and will have an average formula weight similar to the crosslinking oligomer. While the solvent resistance of the resulting composites prepared from prepregs of the blended oligomers may be slightly reduced, the composites will possess superior physical properties in other regards. Tailoring the properties might be achieved by varying the ratio of the crosslinking oligomer to the comparable oligomer. The comparable oligomer can also be prepared by reacting n moles of a dihalogen with (n+1) moles of a bisphenol, and 2 moles of a halobenzene, or other suitable quenching end cap.

While preferred embodiments have been described, those skilled in the art will readily recognize alterations, variations, or modifications that might be made to the embodiments without departing from the inventive concept. The description and examples, accordingly, are intended to illustrate the invention. The claims should be construed liberally in view of the description, and should only be limited as is necessary in view of the pertinent prior art.

We claim:

1. A difunctional end-cap monomer useful in the preparation of oligomers that are resistant to attack by organic solvents, comprising diimidophenols of the general formula:

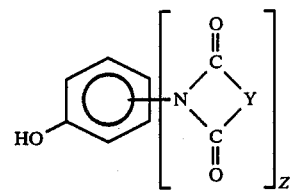

wherein Y=

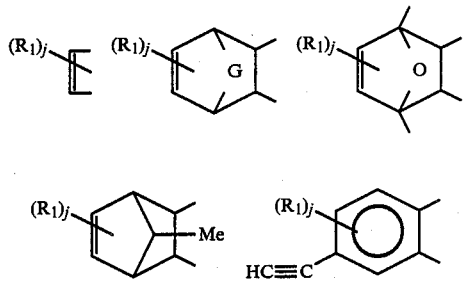

$R_1$=lower alkyl, aryl, substituted aryl, lower alkoxy, or mixtures thereof;

G=—SO$_2$—, —S—, —CH$_2$—, —O—; and j=0, 1, or 2.

2. The monomer of claim 1 wherein Y=

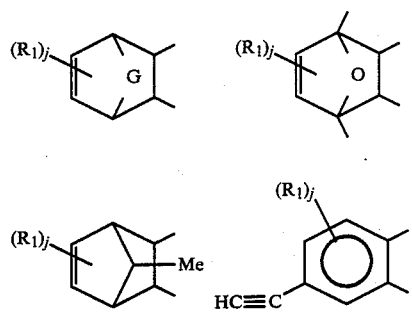

3. The monomer of claim 1 wherein Y=

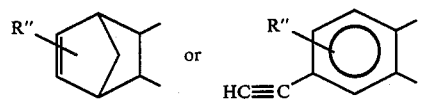

and R″=hydrogen or lower alkyl.

4. The monomer of claim 1 wherein Y=

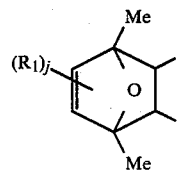

5. The monomer of claim 1 wherein Y=

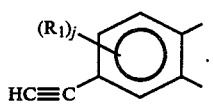
6. The monomer of claim 1 wherein Y=
7. The monomer of claim 1 wherein Y=
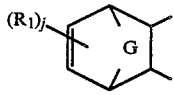
and
$G = -SO_2-, -S-,$ or $-O-$.
8. The monomer of claim 1 wherein Y=
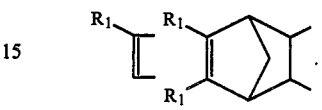
* * * * *

UNITED STATES PATENT AND TRADEMARK OFFICE
CERTIFICATE OF CORRECTION

PATENT NO. : 4,739,030
DATED      : April 19, 1988
INVENTOR(S): H. Lubowitz and C. Sheppard It is certified that error appears in the above-identified patent and that said Letters Patent is hereby corrected as shown below:

At col. 4, lines 15-25, please change

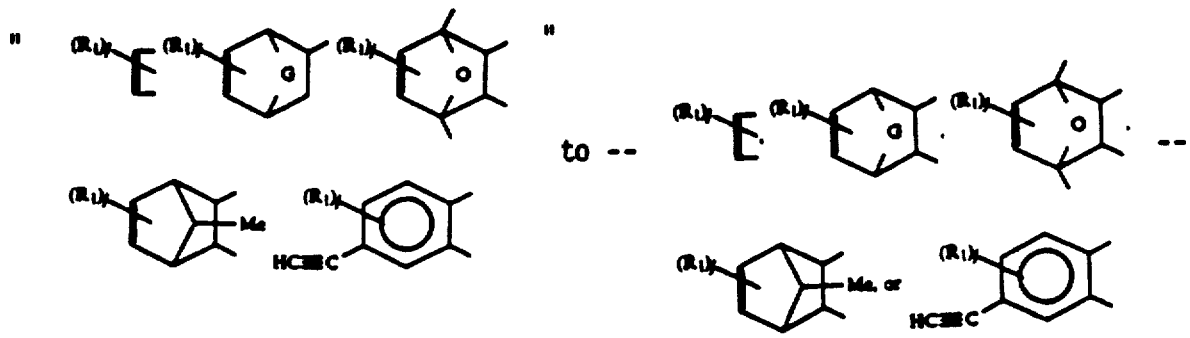

At col. 5, line 66, please change "-(CF$_3$)C-" to -- -(CF$_3$)$_2$C- --.
At col. 10, line 10, please change "Z" to "2."
At col. 12, line 15, please change

Signed and Sealed this

Twenty-seventh Day of September, 1988

Attest:

DONALD J. QUIGG

*Attesting Officer*   *Commissioner of Patents and Trademarks*